(12) United States Patent
Mitchell

(10) Patent No.: US 7,505,208 B1
(45) Date of Patent: Mar. 17, 2009

(54) AIR-GAP OPTICAL STRUCTURE WITH A NONREFLECTIVE AIR-GAP SPACER

(75) Inventor: Daniel Bruce Mitchell, Midland (CA)

(73) Assignee: Raytheon Company, Waltham, MA (US)

(*) Notice: Subject to any disclaimer, the term of this patent is extended or adjusted under 35 U.S.C. 154(b) by 301 days.

(21) Appl. No.: 11/347,981

(22) Filed: Feb. 6, 2006

(51) Int. Cl.
G02B 27/14 (2006.01)
G02B 27/12 (2006.01)

(52) U.S. Cl. .................. 359/634; 359/640
(58) Field of Classification Search .......... 359/634
See application file for complete search history.

(56) References Cited

U.S. PATENT DOCUMENTS

| | | | |
|---|---|---|---|
| 4,084,180 A | 4/1978 | Stoffels | |
| RE30,513 E | 2/1981 | Bleukens et al. | |
| 4,627,688 A * | 12/1986 | Kobayashi et al. | 359/634 |
| 4,707,064 A * | 11/1987 | Dobrowolski et al. | 385/24 |
| 4,784,469 A | 11/1988 | Tsukada | |
| 4,978,503 A | 12/1990 | Shanks et al. | |
| 5,066,101 A | 11/1991 | Aoki et al. | |
| 5,327,289 A | 7/1994 | Watanabe et al. | |
| 5,875,013 A | 2/1999 | Hiroshi | |
| 5,892,630 A | 4/1999 | Broome | |
| 5,900,984 A | 5/1999 | Yamanaka et al. | |
| 5,905,545 A | 5/1999 | Poradish et al. | |
| 6,144,504 A | 11/2000 | Sudoh et al. | |
| 6,215,802 B1 | 4/2001 | Lunt | |
| 6,349,006 B1 * | 2/2002 | Okamori et al. | 359/834 |
| 6,704,145 B1 * | 3/2004 | Benneyworth et al. | 359/640 |
| 6,954,253 B2 | 10/2005 | Noto et al. | |
| 7,002,727 B2 * | 2/2006 | Huibers | 359/291 |
| 2001/0001584 A1 * | 5/2001 | Curley et al. | 359/630 |

* cited by examiner

*Primary Examiner*—Jordan M. Schwartz
*Assistant Examiner*—James C Jones
(74) *Attorney, Agent, or Firm*—Haynes and Boone, LLP

(57) ABSTRACT

An air-gap optical structure includes a first transmissive optical element, a second transmissive optical element, and a spacer structure disposed between the first transmissive optical element and the second transmissive optical element so as to define an air gap therebetween. The spacer structure includes a spacer having a spacer body, and a nonreflective multilayer interference coating between the spacer body and the second transmissive optical element.

15 Claims, 5 Drawing Sheets

AIR-GAP OPTICAL STRUCTURE WITH A NONREFLECTIVE AIR-GAP SPACER

This invention relates to an optical structure having two transmissive optical elements separated by an air gap and, more particularly, to such an optical structure wherein the air gap is defined by one or more air-gap spacers that do not reflect light.

BACKGROUND OF THE INVENTION

Air-gap optical structures are used in optical systems. In an example, two prisms separated by an air gap are used in some designs of reflective digital micromirror device (DMD) projectors. The air-gap optical structure provides for total internal reflection at an air-gap face for some incident angles of light, but transmission through the air-gap face for other incident angles of light. In the projector, an incident beam is reflected from the air-gap face to the reflective DMD display under conditions of total internal reflection, reflected from the DMD display according to the image thereon and back toward the air-gap face, and passed through the air-gap face under transmission conditions for viewing.

The air-gap optical structure is formed by providing two transmissive optical elements (such as prisms or lenses) of the proper shapes, and placing them together in a facing relationship with the air gap defined between the adjacent faces. A number of techniques have been used to form the air gap. For example, in various instances metal shims, deposited layers, and other types of spacers have been positioned between the adjacent faces of the transmissive optical elements to define the air gap.

One of the problems with such air-gap optical structures is stray light produced by reflections within the air-gap optical structure. Some of the stray light may find its way through the projector, reducing the signal-to-noise ratio in the projected image. A number of techniques are candidates for reducing the stray light, such as the use of very careful design and manufacturing techniques that account for stray light and direct the stray elsewhere than into the projected image, and the use of light baffles of various types. In each case, a significant system redesign is required to utilize these techniques for the reduction of stray light, and the redesigns place constraints on the structure and manufacturing process for the air-gap optical structure.

There is a need for an understanding of the source of the stray light, and for an associated less-restrictive, more-general approach for reducing stray light within the air-gap optical structure. The present invention fulfills this need, and further provides related advantages.

SUMMARY OF THE INVENTION

The present invention provides an air-gap optical structure with a reduced level of stray light. The reduction in stray light is achieved using a baseline design of the air-gap optical structure, and modifying the baseline design so as to reduce the sources of the stray light that is otherwise produced. The physical arrangement of the optical components of the air-gap optical structure is not changed, and tight limitations are not imposed on the geometry of the air-gap optical structure that would otherwise adversely affect the uses of the air-gap optical structure.

In accordance with the invention, an air-gap optical structure comprises a first transmissive optical element, a second transmissive optical element, and a spacer structure disposed between the first transmissive optical element and the second transmissive optical element so as to define an air gap therebetween. The spacer structure comprises a spacer having a spacer body, and a nonreflective multilayer interference coating between the spacer body and the second transmissive optical element.

In an application for a visible-light projector, each of the transmissive optical elements are prisms. The prism diagonal faces are in a facing relation with the air gap therebetween. For visible-light applications, the transmissive optical elements may be made, for example, of visible-light-transparent glass or plastic.

In a preferred embodiment, the spacer structure has at least three, and preferably exactly four, coplanar and laterally spaced-apart spacers, each from about 5 to about 15 micrometers thick, most preferably about 10 micrometers thick. The spacer body is metallic and comprises a first layer made of a first metal, and a second layer made of a second metal.

The multilayer interference coating preferably comprises at least three layers. In an embodiment of interest, the multilayer interference coating is made of a first layer of yttrium oxide about 39 nanometers thick, a second layer of titanium oxide about 32 nanometers thick, a third layer of chromium about 10 nanometers thick, and a fourth layer of titanium oxide about 37 nanometers thick. This multilayer interference coating reflects very little white light incident upon the first layer.

Thus, a preferred construction for each of the spacers is the multilayer interference coating on the side of the spacer upon which light is incident, and then the spacer body. The spacer body is preferably metallic, with an iron layer and then a nickel layer overlying the multilayer interference coating.

The present approach is based upon the observation that, in an air-gap optical structure wherein the multilayer interference coating is not present, the primary source of stray light is reflections of the incident light beam from the spacer structure. These stray light reflections then re-reflect from other elements of the optical structure, and some of the stray light eventually finds its way to the output projected beam and thence into the projected image. The result is that the signal-to-noise ratio of the projected image is reduced below what it otherwise would be in the absence of the stray light. The present approach renders the portion of the spacer structure that faces the incident beam nonreflective (i.e., black to visible light), eliminating the source of the stray light. Consequently, it is not necessary to add baffles or redesign the geometry of the air-gap optical structure so as to reduce stray light, because the stray light is not produced in the first place.

The present approach is readily implemented. The multilayer interference coating is deposited onto one of the transmissive optical elements, and then the spacer body is deposited overlying the multilayer interference coating. The other transmissive optical element is placed overlying the side of the spacer body opposite to the multilayer interference coating. In the assembled device, light is incident upon the air gap and the spacer structure from the side of the spacer structure which has the multilayer interference coating thereon.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
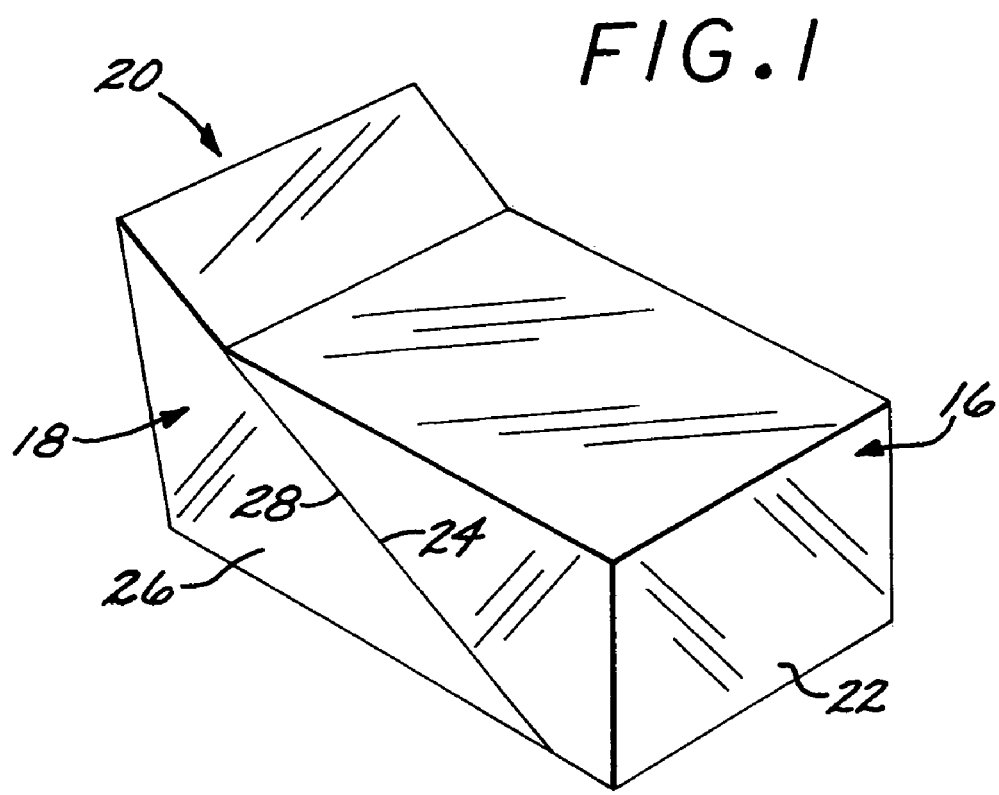
FIG. 1 is a perspective view of an air-gap optical structure.

FIG. 1 depicts an exemplary air-gap optical structure 20 including a first transmissive optical element 16 and a second transmissive optical element 18. In the illustrated embodiment, the first transmissive optical element 16 is a first prism 22 having a first-prism air-gap face 24, and the second transmissive optical element 18 is a second prism 26 having a second-prism air-gap face 28. The air-gap faces 24 and 28 are in a facing-but-spaced-apart relationship. As depicted in the elevational view of FIG. 2, there is an air gap 30 between the air-gap faces 24 and 28. The present approach may be utilized in relation to other air-gap optical structures, for example air-gap lens doublets where the air gap separates two lenses, and Phillips color prisms utilizing multiple prisms. The application of the most interest currently is the air-gap prism structure using the prisms 22 and 26, which will be described in detail.

Figure 2:
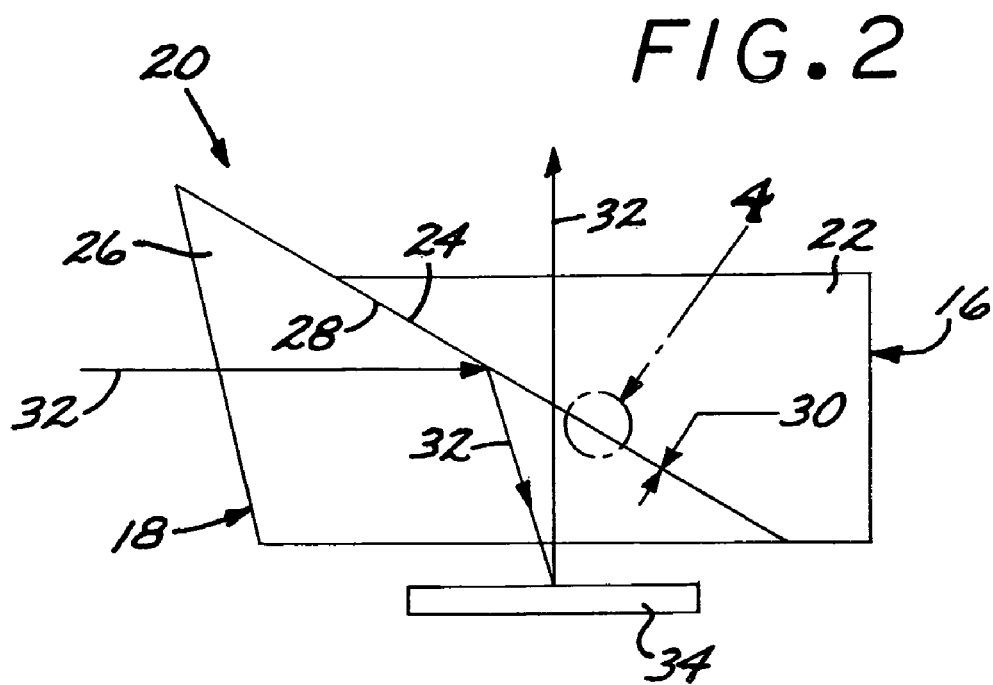
FIG. 2 is a side elevational view of the air-gap optical structure of FIG. 1, illustrating the location of the air gap and a light path in a projection application.

FIG. 2 also shows a schematic ray path for a typical projector application of the air-gap optical structure. A light beam 32 enters the second prism 26 and reflects from the second-prism air-gap face 28 at the proper angle to achieve total internal reflection (TIR). The light beam 32 leaves the second prism 26, reflects from a DMD or other type of image source 34, reenters the second prism 26, and passes through the second-prism air-gap face 28 and the first-prism air-gap face 24 (and thence across the air gap 30) at the proper angle to achieve transmission through the air-gap faces 24 and 28. The light beam 32 passes out of the first prism 22 for viewing or projection. The angularly dependent TIR/transmission properties of the facing air-gap faces 24 and 28 are achieved by positioning the two air-gap faces 24 and 28 parallel to each other and spaced apart by the air gap 30 having an air-gap spacing dimension that is typically from 5 to 15 micrometers, and most preferably 10 micrometers. The present approach may be used, however, to define thicker or thinner air gaps 30.

Figure 3:
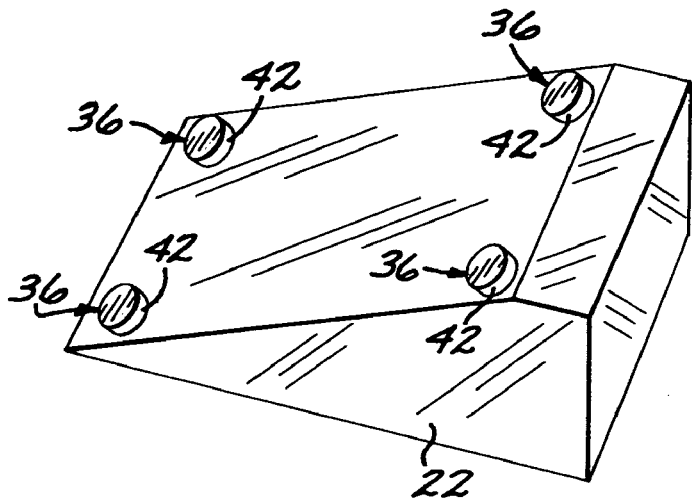
FIG. 3 is a perspective view of the first prism of the air-gap optical structure isolated from the second prism, illustrating the preferred locations of the spacers.
Figure 4:
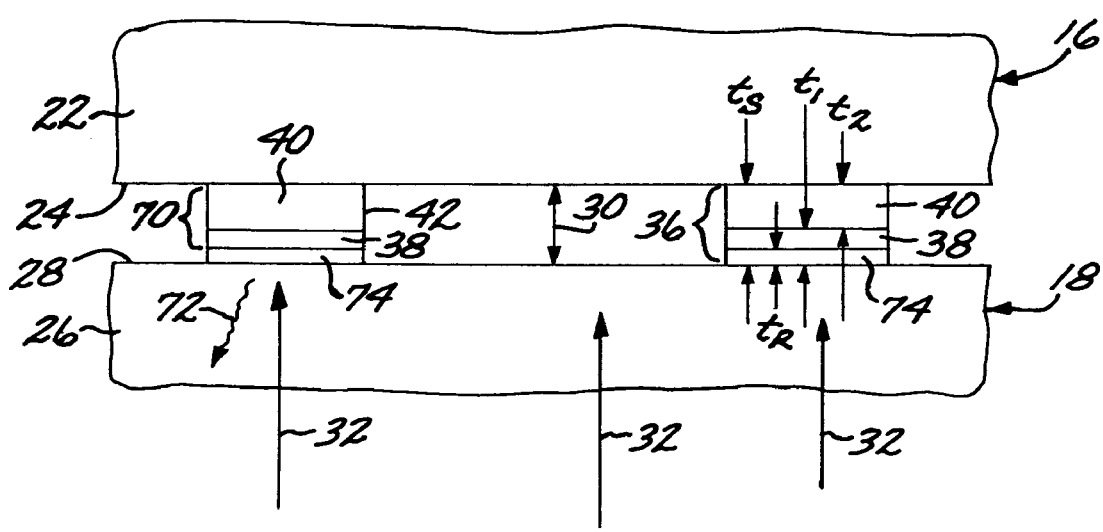
FIG. 4 is an enlarged side elevational view of two of the spacers extending between the two prisms, taken in region 4-4 of FIG. 2.

As illustrated in FIGS. 3-4, a spacer structure 36 having a spacer thickness $t_S$ is disposed between the first prism 22 and the second prism 26 so as to define the air gap 30 therebetween having the same thickness as the spacer thickness $t_S$. The spacer structure 36 is preferably provided in the form of pads 42 deposited on the first-prism air-gap face 24 (or equivalently on the second-prism air-gap face 28). There are preferably at least three pads 42 to form at least a triangular standoff support between the two prisms 22 and 26. In the illustrated embodiment of FIG. 3, there are exactly four pads 42.

The spacer structure 36 preferably comprises a metallic structure having a first layer 38 and made of a first metal with a first-layer thickness $t_1$, and a second layer 40 made of a second metal with a second-layer thickness $t_2$. The first layer 38 and the second layer 40 together comprise a spacer body 70. However, if the spacer structure 36 includes only these layers 38 and 40, a significant portion of the light beam 32 which is incident upon the first layer 38 reflects away as stray light 72. The stray light 72 may reflect from other components of the optical system, and eventually some fraction of the stray light 72 may reach the viewed or projected image. The result is a signal-to-noise ratio that is less than desired due to the presence of the stray light in the viewed or projected image.

To reduce the amount of stray light 72 that is reflected from the spacer structure 36, a nonreflective multilayer interference coating 74 is disposed between the spacer body 70 and the second transmissive optical element 18 (which in this case is the second prism 26). More generally, the nonreflective multilayer interference coating 74 is disposed such that the light beam 32 is incident upon the nonreflective multilayer interference coating 74 rather than upon either of the layers 38 and 40. As will be discussed in more detail subsequently, the nonreflective multilayer interference coating 74 is designed such that it reflects little or no light, thus appearing "black" to the eye for visible light. Consequently, there is little or no stray light 72 reflected from the spacer structure 36. The result is that the signal-to-noise ratio of the viewed or projected image is not significantly degraded by stray light 72.

FIG. 4 illustrates the nonreflective multilayer interference coating 74 as lying between the first layer 38 of the spacer body 70 and the second transmissive optical element 18. If the spacer body 70 is formed with the second layer 40 adjacent to the second transmissive optical element 18, equivalently for the present purposes the nonreflective multilayer interference coating 74 may be deposited to lie between the first layer 38 and the first transmissive optical element 16. The primary consideration is that the nonreflective multilayer interference coating 74 must be positioned so that the light beam 32 strikes the nonreflective multilayer interference coating 74 before reaching either the first layer 38 or the second layer 40.

The spacer-structure thickness $t_S$ is selected to produce the desired thickness $t_S$ of the gap 30. In the usual case, the spacer thickness $t_S$ is from 5 to 15 micrometers, and most preferably 10 micrometers. The present approach may be used to form thicker or thinner spacer structures 36, but it is most advantageously applied to make spacer structures that are in this range of 5-15 micrometers. Spacer structures in this range cannot practically be made using shims, spacer balls, and the like, both because the required shims and spacer balls are not readily available and because they cannot readily be handled and positioned in a production setting. Spacings smaller than about 5 micrometers are more advantageously achieved with single-layer spacer structures, but may be made using the present approach if desired.

The spacer thickness $t_S$ is preferably not evenly divided between the first-layer thickness $t_1$, the second-layer thickness $t_2$, and a thickness $t_R$ of the nonreflective multilayer interference coating 74. Instead, the first-layer thickness $t_1$ is preferably much smaller than the second-layer thickness $t_2$ as a result of the preferred fabrication approach to be discussed subsequently, and the thickness $t_R$ of the nonreflective multilayer interference coating 74 is much smaller than the first-layer thickness $t_1$. Typically, the first layer 38 has its first-layer thickness $t_1$ of less than 1 micrometer, the second layer 40 has its second-layer thickness $t_2$ of greater than 5 micrometers, and preferably from 5 to 15 micrometers, and the thickness $t_R$ of the nonreflective multilayer interference coating 74 is on the order of a few hundred nanometers or less. The thickness $t_R$ of the nonreflective multilayer interference coating 74 is so small as to be essentially negligible compared with the thicknesses of the layers 38 and 40.

Figure 5:
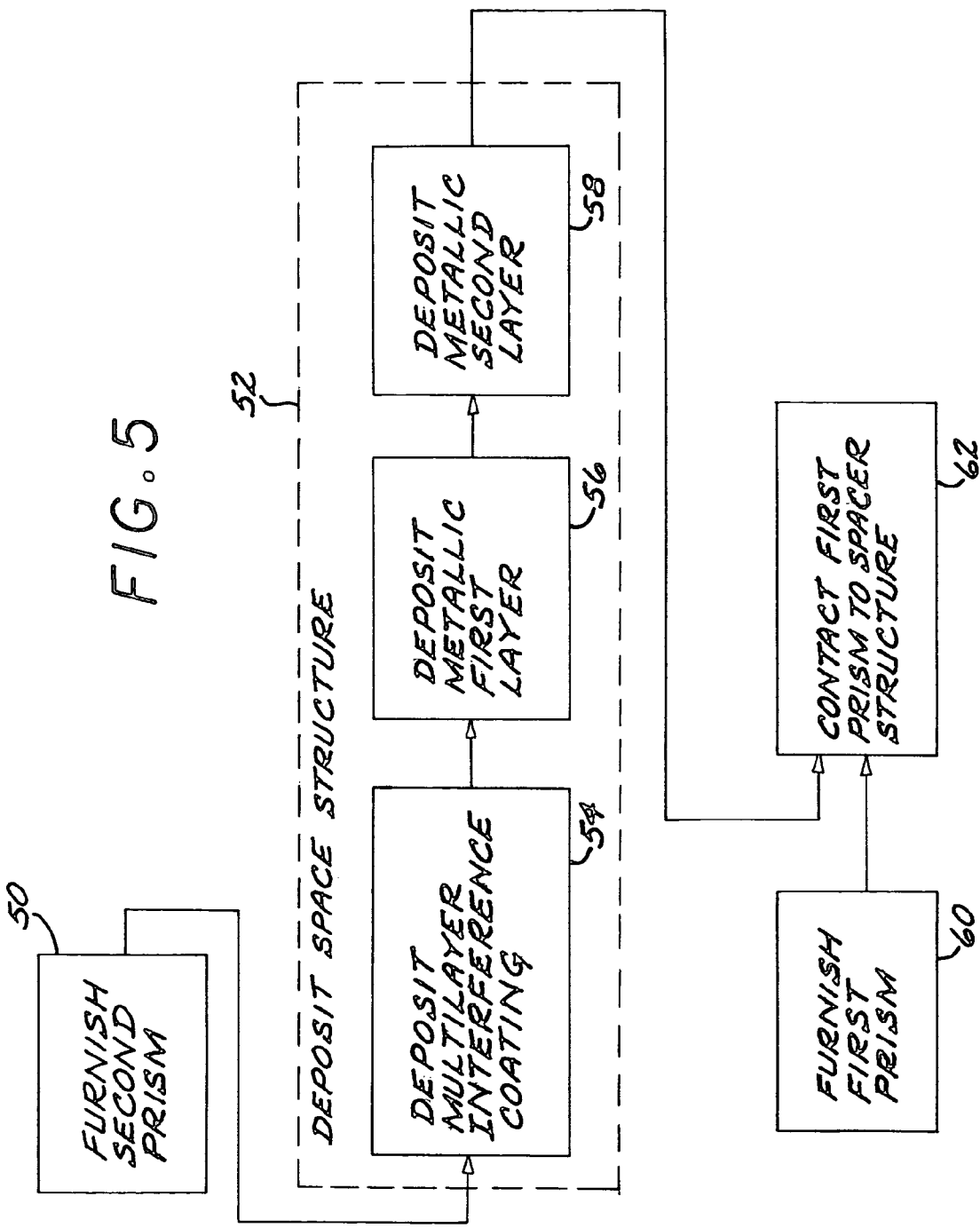
FIG. 5 is a block diagram of one embodiment of a method for producing the air-gap optical structure.
Figure 6:
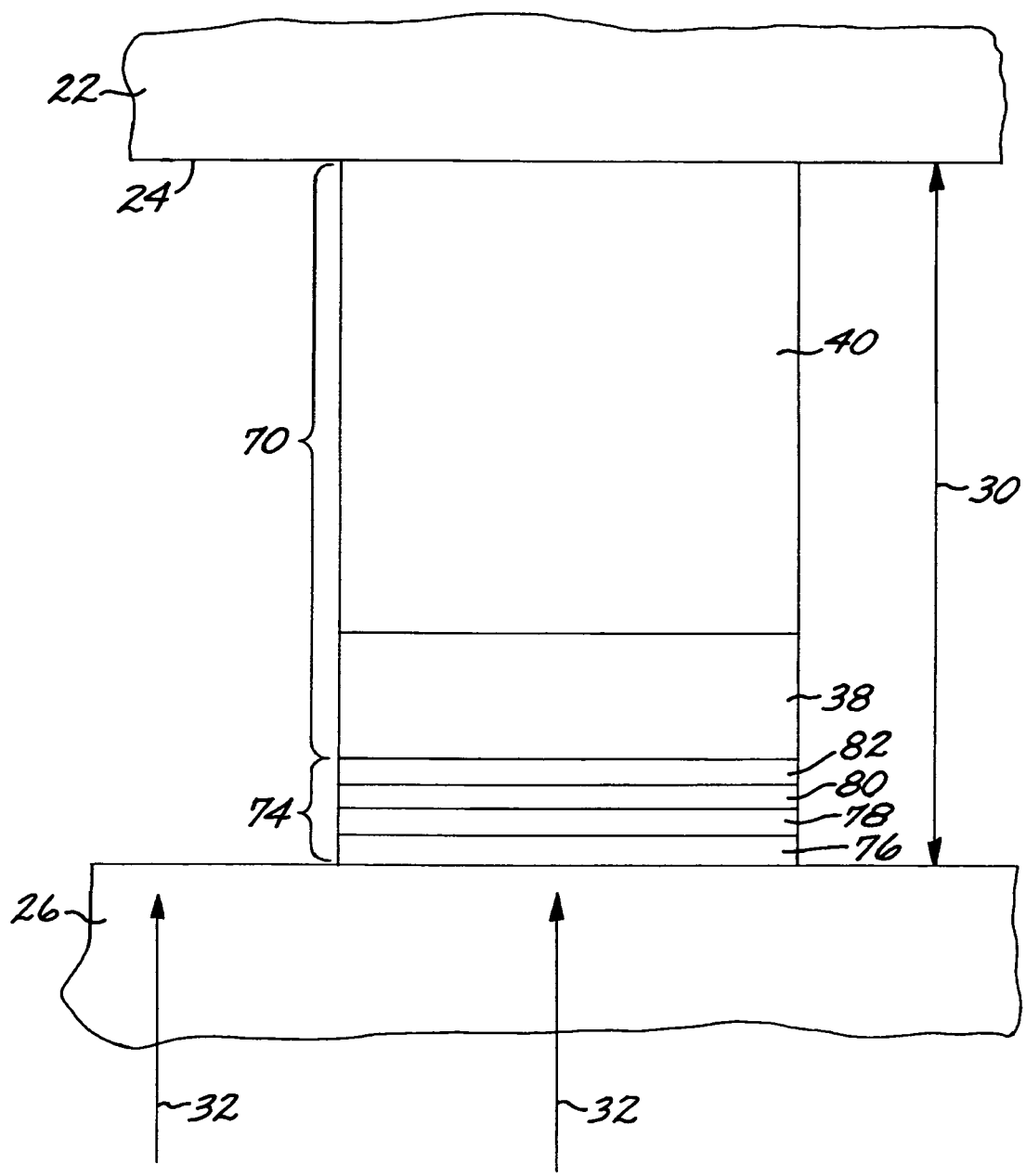
FIG. 6 is a further enlarged side elevational view of one of the spacers of FIG. 4.

FIG. 5 depicts a preferred approach for practicing the invention. The prior discussion of features is incorporated herein. The second prism 26 is furnished, step 50. The second prism 26 is made of a material that is transparent to the light wavelengths of interest. For example, for visible light the second prism 26 may be a glass such as BK7 glass, and for infrared light the second prism 26 may be silicon. The second prism 26 is fabricated to the desired shape and size by known techniques such as casting, machining, grinding, and/or crystal growth.

The spacer structure 36 is deposited upon the second prism 26, step 52 (or equivalently, upon the first prism 22, reversing the order of the specific deposition steps discussed next). The deposition step 52 is preferably accomplished by a series of process steps in which the nonreflective multilayer interference coating 74 is deposited onto the second-prism air-gap face 28, step 54; the first layer 38 is thereafter deposited onto the nonreflective multilayer interference coating 74, step 56; and the second layer 40 is thereafter electrodeposited onto the first layer 38, step 58. These three steps are preferably accomplished in two types of deposition apparatus, in which steps 54 and 56 are performed in a vapor deposition apparatus with appropriate masks, and step 58 is preferably accomplished in an electroless deposition apparatus.

The nonreflective multilayer interference coating 74 is custom designed for each application. Computer programs used to design such wavelength-selective coatings are commercially available, and for example include the Filmstar®, Film-Wizard, and TF Calc programs. The nonreflective multilayer interference coating 74 typically has at least three individual layers. In a preferred embodiment illustrated in FIG. 6, the nonreflective multilayer interference coating 74 has exactly four layers. (FIG. 6, like FIGS. 1-4, is not drawn to scale.) In this preferred embodiment, a first interference coating layer 76 (deposited upon and contacting the second prism air gap face 28 of the second prism 26) is yttrium oxide ($Y_2O_3$) having a thickness of 39 nanometers; a second interference coating layer 78 (deposited upon and contacting the first interference coating layer 76) is titanium dioxide ($TiO_2$) having a thickness of 32 nanometers; a third interference coating layer 80 (deposited upon and contacting the second interference coating layer 78) is chromium metal (Cr) having a thickness of 10 nanometers; and a fourth interference coating layer 82 (deposited upon and contacting the third interference coating layer 80) is titanium dioxide ($TiO_2$) having a thickness of 37 nanometers. This combination of layers 76, 78, 80, and 82 making up the multilayer interference coating 74 is presented as an example where the light beam 32 is visible white light, but more generally any operable combination of layers may be used to form the multilayer interference coating 74. If the light beam 32 with which the air-gap optical structure 20 is to be used is some other type of light, the multilayer interference coating 74 is designed to absorb that other type of light. The deposition of the layers 76, 78, 80, and 82 is accomplished by any appropriate deposition technique, with examples being chemical vapor deposition (CVD), physical vapor deposition (PVD), or sputtering. Appropriate masks are used to define the transverse shapes and sizes of the layers 76, 78, 80, and 82 to form the spacer structure 36.

The first layer 38 is thereafter deposited overlying and contacting the nonreflective multilayer interference coating 74, step 56, by any operable approach, with vapor deposition through a mask being preferred. An example is electron beam physical vapor deposition through a mask. Iron is the preferred material for the first layer 38, but other metals and nonmetals that are compatible with the formation of the second layer 40, and in this case catalyze its deposition, may be used as well.

The second layer 40 is thereafter deposited overlying and contacting the first layer 38, step 58, by any operable approach, with catalyzed electroless deposition of nickel being preferred. Catalyzed electroless deposition of nickel is well known in the art for other applications. The catalyzed electroless deposition of nickel occurs only on the deposited first layer 38, and therefore nickel only deposits on the areas of the pads 42 that were previously deposited in steps 54 and 56. This type of multi-layered deposition is preferred because while electroless deposition is a relatively rapid and readily controlled deposition approach, it cannot deposit directly onto an electrically nonconducting substrate such as the nonreflective multilayer interference coating 74 or the second prism 26. The deposition of the first layer 38 provides a base upon which the second layer 40 may be electroless deposited. The vapor deposition of the nonreflective multilayer interference coating 74 and the first layer 38 are relatively slow, but they are deposited upon the nonreflective multilayer interference coating 74. For these reasons, the multilayer interference coating 74 and the first layer 38 are normally selected to be relatively much thinner than the second layer 40. The result is the metallic spacer structure 36 is deposited upon the electrically nonconducting prism 26 in an economic and highly controlled manner. Additionally, both of these deposition procedures may be performed with a high degree of precision as to the location of the deposition and the thickness of each deposited layer. The location and thickness of the spacer structure 36, and each of its individual layers, may therefore be determined very precisely by the deposition approach.

After the spacer structure 36 is deposited in step 52, the first prism 22 is furnished, step 60. The first prism 22 is prepared in a manner like that of the second prism 26 and is preferably of the same material of construction. The prior description in relation to the second prism 26 is incorporated here.

The first prism 22 is thereafter contacted, step 62, to the spacer structure 36 already deposited on the second prism 26, so that the spacer structure 36 lies between the first prism 22 and the second prism 26 and defines the air gap 30 therebetween. Optionally, the structure of the first prism 22, the second prism 26, and the spacer structure 36 may be held together as an integral unit by any operable approach. A preferred approach is to bond side plates (not shown) onto the sides of the air-gap optical structure 20.

Figure 7:
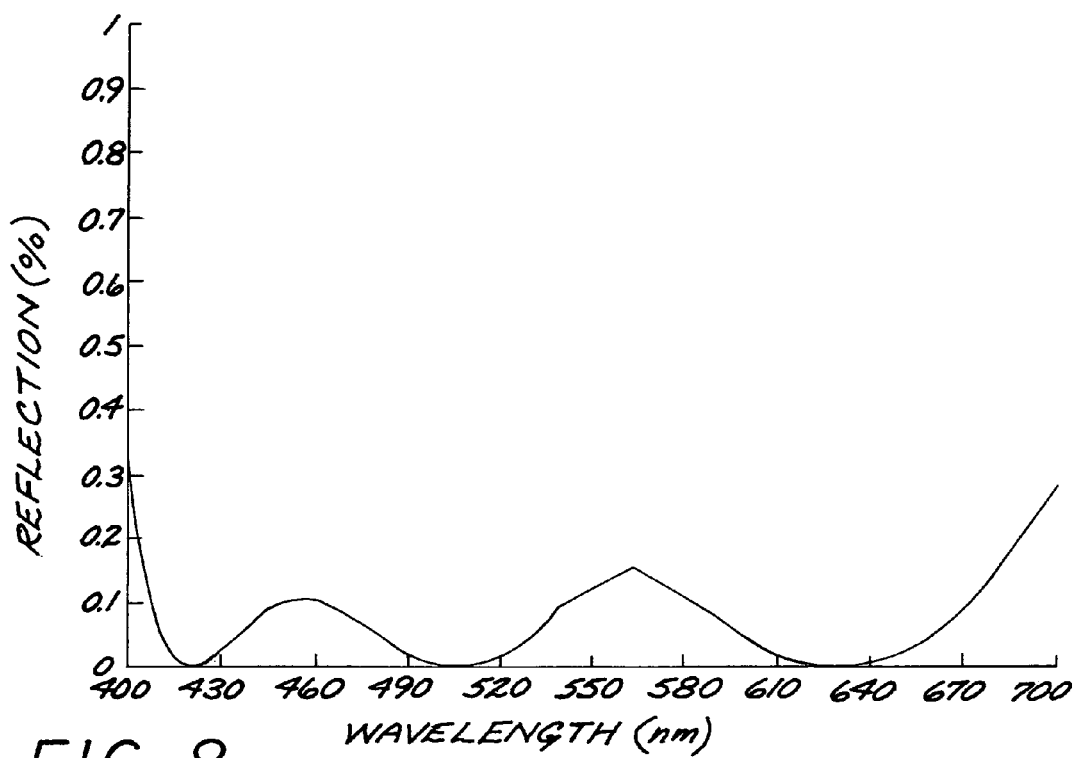
FIG. 7 is a calculated graph of reflection as a function of wavelength from a spacer structure having the preferred nonreflective multilayer interference coating thereon.
Figure 8:
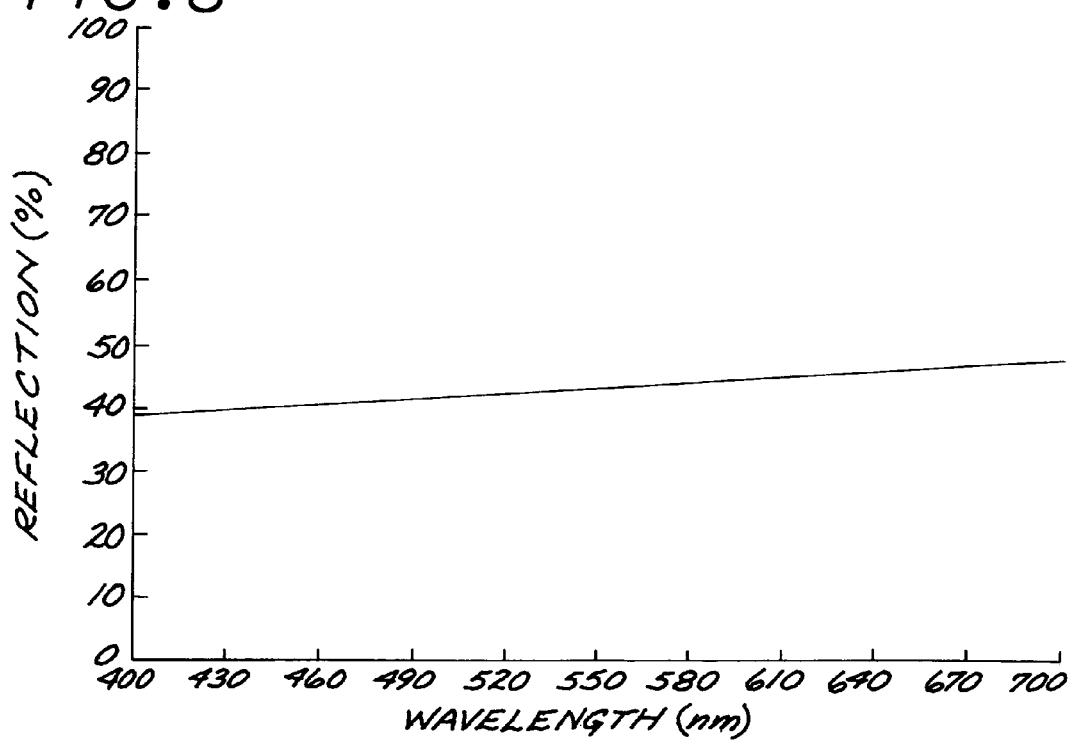
FIG. 8 is a calculated graph of reflection as a function of wavelength from a spacer structure which does not have the preferred nonreflective multilayer interference coating thereon.

The present approach reduces the amount of stray light 72 reflected from the spacer structure 36. FIG. 7 is a calculated graph of percentage reflection from the spacer structure 36 incorporating the preferred form (the four-layer structure of yttrium oxide, titanium oxide, chromium, and titanium dioxide discussed above) of the nonreflective multilayer interference coating 74, as a function of wavelength of the light beam 32. For comparison, FIG. 8 is a calculated graph of percentage reflection from a spacer structure having no nonreflective multilayer interference coating 74, and including only the layers 38 and 40. The percentage reflection of FIG. 7 from the spacer structure 36 is about 0.1 percent, averaged over the visible spectrum, while the percentage reflection of FIG. 8 from the spacer structure 36 is about 45 percent, averaged over the visible spectrum. The improvement evidenced in FIG. 7 results in greatly reduced stray light 72 and a greatly improved signal-to-noise ratio in a projected image. The percentage reflection from the spacer structure 36 of FIG. 7 could be reduced even further by using a more complex nonreflective multilayer interference coating 74 having more layers, at the cost of greater complexity and cost in the deposition step 54.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An air-gap optical structure comprising:
   a first transmissive optical element;
   a second transmissive optical element; and
   a spacer structure disposed between the first transmissive optical element and the second transmissive optical element so as to define an air gap therebetween, wherein the spacer structure comprises a spacer having
   a spacer body, and
   a substantially nonreflective multilayer interference coating between the spacer body and the second transmissive optical element.

2. The air-gap optical structure of claim 1, wherein the first transmissive optical element and the second transmissive optical element are each made of glass.

3. The air-gap optical structure of claim 1, wherein the spacer body is metallic and comprises
   a first layer made of a first metal, and
   a second layer made of a second metal overlying and contacting the first layer.

4. The air-gap optical structure of claim 1, wherein a spacer thickness is from about 5 to about 15 micrometers.

5. The air-gap optical structure of claim 1, wherein the spacer structure comprises at least three coplanar and laterally spaced-apart spacers.

6. The air-gap optical structure of claim 1, wherein
   the first transmissive optical element is a first prism, and
   the second transmissive optical element is a second prism.

7. The air-gap optical structure of claim 1, wherein the multilayer interference coating comprises at least three layers.

8. The air-gap optical structure of claim 1, wherein the multilayer interference coating comprises
   a first layer of yttrium oxide,
   a second layer of titanium oxide,
   a third layer of chromium, and
   a fourth layer of titanium oxide.

9. An air-gap optical structure comprising:
   a first transmissive prism;
   a second transmissive prism; and
   a spacer structure disposed between the first transmissive prism and the second transmissive prism so as to define an air gap therebetween, wherein the spacer structure comprises a spacer having
   a metallic spacer body, and
   a substantially nonreflective multilayer interference coating between the spacer body and the second transmissive prism, wherein the multilayer interference coating has at least three layers.

10. The air-gap optical structure of claim 9, wherein the first transmissive optical element and the second transmissive optical element are each made of glass.

11. The air-gap optical structure of claim 9, wherein the spacer body is metallic and comprises
    a first layer made of a first metal, and
    a second layer made of a second metal overlying and contacting the first layer.

12. The air-gap optical structure of claim 9, wherein the spacer thickness is from about 5 to about 15 micrometers.

13. The air-gap optical structure of claim 9, wherein the spacer structure comprises at least three coplanar and laterally spaced-apart spacers.

14. The air-gap optical structure of claim 9, wherein the multilayer interference coating comprises at least three oxide layers.

15. The air-gap optical structure of claim 9, wherein the multilayer interference coating comprises
    a first layer of yttrium oxide about 39 nanometers thick,
    a second layer of titanium oxide about 32 nanometers thick,
    a third layer of chromium about 10 nanometers thick, and
    a fourth layer of titanium oxide about 37 nanometers thick.

\* \* \* \* \*